US007026030B2

(12) United States Patent
Itoh et al.

(10) Patent No.: US 7,026,030 B2
(45) Date of Patent: Apr. 11, 2006

(54) OPTICAL INFORMATION MEDIUM

(75) Inventors: Hidetake Itoh, Tokyo (JP); Kazushi Tanaka, Tokyo (JP); Naoki Hayashida, Tokyo (JP)

(73) Assignee: TDK Corporation, Tokyo (JP)

( * ) Notice: Subject to any disclaimer, the term of this patent is extended or adjusted under 35 U.S.C. 154(b) by 9 days.

(21) Appl. No.: 10/970,184

(22) Filed: Oct. 22, 2004

(65) Prior Publication Data

US 2005/0112319 A1    May 26, 2005

(30) Foreign Application Priority Data

Oct. 31, 2003  (JP)  ............................. 2003-372940

(51) Int. Cl.
    *B32B 3/02* (2006.01)
(52) U.S. Cl. ................ 428/64.1; 428/64.4; 430/270.11
(58) Field of Classification Search ............... 428/64.1, 428/64.4, 913; 430/270.11, 495.1, 945
    See application file for complete search history.

(56) References Cited

U.S. PATENT DOCUMENTS

| 5,518,788 | A  | * | 5/1996 | Invie ........................ 428/65.1 |
| 2002/0086962 | A1 | * | 7/2002 | Upper ........................ 526/242 |
| 2004/0181087 | A1 | * | 9/2004 | Hayashida et al. ........... 560/51 |
| 2004/0197516 | A1 | * | 10/2004 | Suzawa et al. ............. 428/64.4 |
| 2004/0218511 | A1 | * | 11/2004 | Kondo et al. ............... 369/288 |
| 2005/0013965 | A1 | * | 1/2005 | Itoh et al. .................. 428/64.4 |
| 2005/0072336 | A1 | * | 4/2005 | Itoh et al. ............... 106/287.28 |
| 2005/0089665 | A1 | * | 4/2005 | Hayashida et al. ........ 428/64.4 |
| 2005/0095432 | A1 | * | 5/2005 | Hayashida et al. ...... 428/411.1 |

FOREIGN PATENT DOCUMENTS

| JP | 10-110118 | 4/1998 |
| JP | 11-213444 | 8/1999 |
| JP | 11-293159 | 10/1999 |
| JP | 2002-190136 | 7/2002 |

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

The present invention provides an optical information medium in which the recording and/or reproducing beam incident side surface displays excellent anti-staining properties and lubricity, as well as superior scratch resistance and abrasion resistance. An optical information medium comprising a film element composed of one or more layers including at least a recording layer (4) or a reflective layer, on a supporting substrate (20), wherein at least one of the supporting substrate (20)-side surface and the film element-side surface is formed of a hard coat layer (8) comprising a cured product of the hard coat agent composition comprising a fluorine-containing block copolymer (A) and an active energy ray-curable compound (B).

13 Claims, 2 Drawing Sheets

Laser beam

OPTICAL INFORMATION MEDIUM

BACKGROUND OF THE INVENTION

1. Field of the Invention

The present invention relates to an optical information medium such as a read-only optical disk, an optical recording disk or a magneto-optical recording disk, and more specifically to an optical information medium in which the recording and/or reproducing beam incident side surface displays excellent anti-staining properties and lubricity, as well as superior scratch resistance and abrasion resistance.

2. Disclosure of the Related Art

On the surfaces of optical disks such as read-only optical disks, optical recording disks and magneto-optical recording disks, the stains from various stain materials and the adhesion of fingerprints are caused during use. These stains and adhesion fingerprints are undesirable, and accordingly, the surfaces of optical disks may be subjected to a suitable surface treatment to improve the anti-staining property, reduce the adhesion of fingerprints, and improve the ease with which fingerprints can be removed. For example, a variety of different water repellent and oil repellent treatments are being investigated for the surfaces of optical disks.

Furthermore, the formation of a transparent, scratch resistant hard coat on the recording and/or reproducing beam incident side surface of the optical information medium is also standard practice for improving the scratch resistance of the medium surface. Formation of this hard coat is conducted by applying an active energy ray-polymerizable/curable compound containing at least 2 polymerizable functional groups such as (meth)acryloyl groups within each molecule onto the surface of the medium, and then curing the applied film by irradiation with active energy rays such as ultraviolet rays. However, because this type of hard coat only aims to improve the scratch resistance, little can be expected in terms of an anti-staining effect relative to stain materials such as dust, airborne oil mist or fingerprints.

One example of a hard coat with an anti-staining property relative to organic stains is disclosed in Japanese Laid-open Patent Publication No. 10-110118 (1998), which proposes the blending of a non-crosslinking fluorine-based surfactant with a hard coat agent. The non-crosslinking fluorine based surfactant contains no polymerizable double bonds, and undergoes no crosslinking with the base resin of the hard coat agent.

Furthermore, Japanese Laid-open Patent Publication No. 11-293159 (1999) proposes the blending of a combination of a non-crosslinking fluorine-based surfactant and a crosslinking fluorine-based surfactant with a hard coat agent. Examples of the crosslinking fluorine-based surfactant include fluorinated alkyl (meth)acrylates such as perfluorooctylethyl (meth)acrylate, hexafluoropropyl (meth)acrylate and octafluoropentyl (meth)acrylate. These crosslinking fluorine-based surfactants contain polymerizable double bonds, and undergo crosslinking and fixation to the base resin of the hard coat agent.

Japanese Laid-open Patent Publication No. 11-213444 (1999) discloses the application of a fluorine-based polymer to the surface of a conventional optical disk substrate formed from a polycarbonate or the like.

Japanese Laid-open Patent Publication No. 2002-190136 discloses an optical information medium in which metal chalcogenide fine particles of silica or the like are blended into the hard coat, thereby improving the scratch resistance of the hard coat, and in which a film of a silane coupling agent comprising water repellent or oil repellent groups is provided on the hard coat, thereby further improving the anti-staining properties of the optical information medium surface.

SUMMARY OF THE INVENTION

By making the coefficient of friction of the optical information medium surface low, an impact caused when a hard projection contacts the surface can be slipped away; therefore, the generation of scratches can be suppressed. For this reason, it is desired to decrease the coefficient of friction of the surface of the hard coat to improve the scratch resistance of the surface. Recent developments have seen the appearance of Blu-ray discs, in which the spot size of focused laser beam is reduced by increasing the numerical aperture (NA) of the objective lens to focus the recording/reproducing laser beam to approximately 0.85, and at the same time reducing the wavelength $\lambda$ of the recording/reproducing laser beam to approximately 400 nm, and these discs have a recording capacity four times or more that of DVD. Increasing NA generally leads to a decreased distance between the objective lens and the surface of the optical information medium (i.e., working distance), which significantly increases the likelihood that the surface of the optical information medium will come into contact with the objective lens, or the support of the lens, during the rotation of the optical information medium (for example, for NA of approximately 0.85, working distance is approximately 100 µm, a significant decrease from conventional optical systems). For this reason, it is desired to reduce the coefficient of friction of the hard coat surface while increasing the scratch resistance of the surface.

However, such conventional hard coat materials as described above suffer not only from a variety of physical problems such as poor durability of the anti-staining property or insufficient hardness, but also tend to be expensive to produce.

Accordingly, an object of the present invention is to provide an optical information medium in which the surface upon which the recording and/or reproducing beam is incident displays excellent anti-staining properties and lubricity, as well as superior scratch resistance and abrasion resistance.

The present inventors made eager investigation. As a result, the present inventors have found out that by forming at least one surface of an optical information medium, and preferably the surface upon which the recording and/or reproducing beam is incident, as a hard coat layer formed from a cured product of a hard coat agent composition comprising a fluorine-containing block copolymer and an active energy ray-curable compound, an optical information medium that achieves the above object could be obtained.

The present invention comprises the followings:

(1) An optical information medium comprising a film element composed of one or more layers including at least a recording layer or a reflective layer, on a supporting substrate, wherein at least one of the supporting substrate-side surface and the film element-side surface is formed of a hard coat layer comprising a cured product of a hard coat agent composition comprising a fluorine-containing block copolymer (A) and an active energy ray-curable compound (B).

(2) The optical information medium according to (1), wherein the fluorine-containing block copolymer (A) comprises a fluorine-containing segment and a hydroxyl group-containing segment.

(3) The optical information medium according to (2), wherein the fluorine-containing block copolymer (A) is a copolymer in which an active energy ray-reactive group has been introduced into the hydroxyl group-containing segment.

(4) The optical information medium according to (2), wherein the fluorine-containing block copolymer (A) is a copolymer in which an active energy ray-reactive group has been introduced into the hydroxyl group-containing segment via a urethane linkage.

(5) The optical information medium according to (2), wherein the fluorine-containing block copolymer (A) is a copolymer in which, into the hydroxyl group-containing segment, a monomer containing one ethylenic unsaturated double bond and one isocyanate group within each molecule has been introduced via a urethane linkage derived from the hydroxyl group and the isocyanate group.

(6) The optical information medium according to any of (1) to (5), wherein the hard coat agent composition comprises 0.1 part by weight or more and 10 parts by weight or less of the fluorine-containing block copolymer (A) per 100 parts by weight of the nonvolatile content of the composition. This nonvolatile content includes not only the fluorine-containing block copolymer (A) and the curable compound (B), but also optional components such as inorganic fine particles (C), a photopolymerization initiator, and a variety of other additives, as described below.

(7) The optical information medium according to any of (1) to (6), wherein the hard coat agent composition further comprises inorganic fine particles (C) with an average particle size of not more than 100 nm.

(8) The optical information medium according to (7), wherein the inorganic fine particles (C) are either fine particles of a metal (or semi-metal) oxide, or fine particles of a metal (or semi-metal) sulfide.

(9) The optical information medium according to (8), wherein the inorganic fine particles (C) are fine particles of silica.

(10) The optical information medium according to either one of (8) and (9), wherein the inorganic fine particles (C) are modified on the surface with a hydrolyzable silane compound containing an active energy ray-reactive group.

(11) The optical information medium according to any of (7) to (10), wherein the hard coat agent composition comprises 5 parts by weight or more and 500 parts by weight or less of the inorganic fine particles (C) per 100 parts by weight of the active energy ray-curable compound (B).

(12) The optical information medium according to (11), wherein either one of the supporting substrate-side surface or the film element-side surface upon which the light is incident is formed of the hard coat layer.

(13) The optical information medium according to either one of (11) and (12), comprising an information recording layer on the supporting substrate, a light-transmitting layer on the information recording layer, and the hard coat layer on the light-transmitting layer.

In the present invention, the term "optical information medium" is intended to encompass read-only optical disks, optical recording disks, magneto-optical recording disks, and other media.

The present invention provides an optical information medium in which the recording and/or reproducing beam incident side surface displays excellent anti-staining properties and lubricity, as well as superior scratch resistance and abrasion resistance.

DETAILED DESCRIPTION OF THE INVENTION

As follows is a description of an optical information medium of the present invention (hereafter also referred to as an optical disk), as well as a method for producing such an optical information medium, with reference to the drawings. In an optical disk of the present invention, at least one of the supporting substrate-side surface and the film element-side surface, and preferably the surface upon which the recording/reproducing beam is incident, is formed of a hard coat layer comprising a cured product of a hard coat agent composition comprising a fluorine-containing block copolymer (A) and an active energy ray-curable compound (B).

1. Optical Information Media in Which the Film Element-Side Surface Acts as the Surface Upon Which the Recording/Reproducing Beam is Incident:

First an optical information medium, in which the film element-side surface acts as the surface upon which the recording/reproducing beam is incident, will be described.

Figure 1:
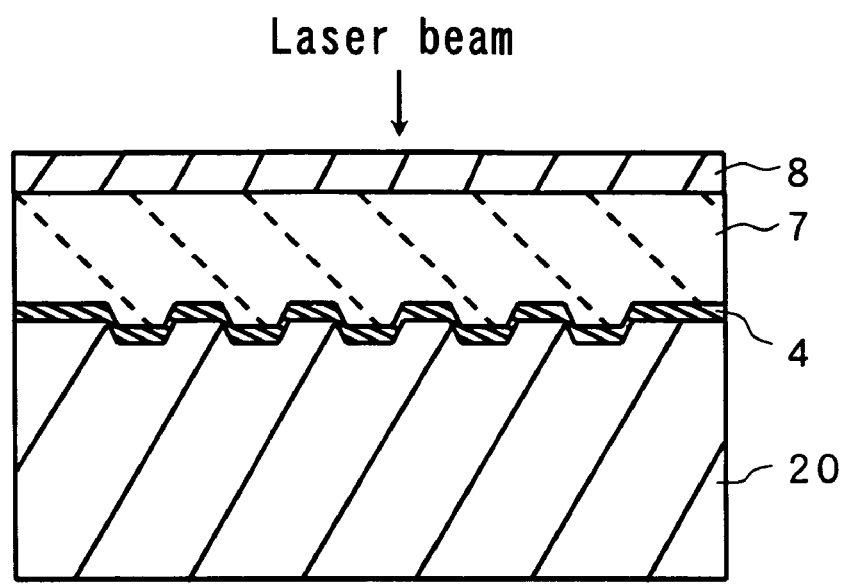
FIG. 1 is a schematic cross-sectional view showing one example of the layer structure of an optical disk of the present invention.

FIG. 1 is a schematic cross-sectional view showing one example of the layer structure of an optical disk of the present invention. This optical disk is a recording medium, and comprises a recording layer (4) that functions as an information recording layer on a supporting substrate (20) of comparatively high rigidity, a light-transmitting layer (7) on the recording layer (4), and a light transmitting hard coat layer (8) on the light-transmitting layer (7). The hard coat layer (8) acts as the surface upon which the recording/reproducing beam is incident, and the laser beam for recording or reproducing is incident through the hard coat layer (8) and the light-transmitting layer (7), and onto the recording layer (4). The thickness of the light-transmitting layer (7), including the hard coat layer (8), is preferably within a range from 30 to 150 μm, and even more preferably from 70 to 150 μm. An example of this type of optical disk is the Blu-ray Disc. The hardness of the hard coat layer (8) side is at least grade B in a pencil hardness test.

Although not shown in the drawings, the present invention also includes optical disks with two or more recording layers, in which an additional recording layer is provided on the recording layer (4) with a spacer layer disposed therebetween. In such cases, the light-transmitting layer (7) and the hard coat layer (8) are formed on the recording layer positioned farthest from the supporting substrate (20).

The present invention can be applied to all different manner of recording layers. In other words, the invention can be applied to phase-change type recording media, pit formation type recording media, and magneto-optical recording media. Normally, a dielectric layer or a reflective layer is provided on at least one side of the recording layer in order to protect the recording layer and provide an optical effect, but this layer has been omitted in FIG. 1. Furthermore, the present invention is not restricted to recordable type media such as that shown in the drawings, and can also be applied to read-only type media. In such cases, the pit sequence is formed as an integrated part of the supporting substrate (20), and the reflective layer (a metal layer or a dielectric multilayered film) that covers the pit sequence functions as the information recording layer.

An optical information medium of the present invention that employs a phase-change type recording medium will be described below.

Figure 2:
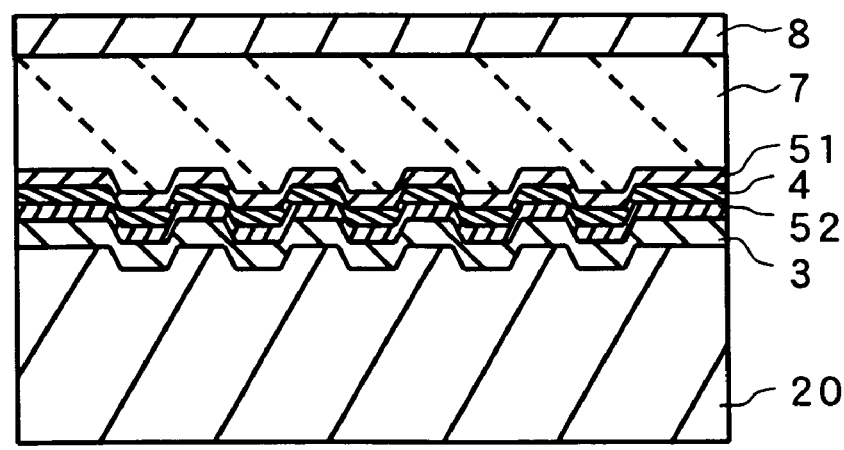
FIG. 2 is a schematic cross-sectional view showing one example of the layer structure of an optical disk of the present invention.

FIG. 2 is a schematic cross-sectional view showing one example of the layer structure of an optical disk of the present invention. In FIG. 2, an optical disk has a supporting substrate (20) having information pits, pregrooves, and other fine scale concavities-convexities formed on one surface thereof. On this surface, the optical disk has a reflective layer (3), a second dielectric layer (52), a phase-change recording material layer (4), and a first dielectric layer (51) formed in this order, and further has a light transmitting layer (7) on the first dielectric layer (51), and a hard coat layer (8) on the light transmitting layer (7). In this example, an information recording layer is formed of the reflective layer (3), the second dielectric layer (52), the phase-change recording material layer (4), and the first dielectric layer (51). A film element necessary for recording or reproducing is formed of the information recording layer and the light transmitting layer (7). When using the optical disk, a laser beam for recording or reproducing is incident through the hard coat layer (8) and the light transmitting layer (7), namely the film element side.

The supporting substrate (20) has a thickness of 0.3 to 1.6 mm, preferably of 0.4 to 1.3 mm, and includes information pits, pregrooves, and other fine scale concavities-convexities formed on the surface on which the recording layer (4) is formed.

The supporting substrate (20) is not required to be optically transparent when the optical disk is used in such a manner that a laser beam is incident through the film element side as described above. However, as transparent materials, various plastic materials including polycarbonate resins, acrylic resins such as polymethyl methacrylate (PMMA), and polyolefine resins and the like may be used. Alternatively, glass, ceramics or metals and the like may be also used. If a plastic material is employed, the pattern of the concavity-convexity in the surface will be often produced by injection molding, whereas the pattern will be formed by a photopolymer process (2P process) in the case of any material other than plastics.

The reflective layer (3) is usually deposited by a sputtering process on the supporting substrate (20). As a material for the reflective layer, a metallic element, semi-metallic element, semiconductor element or a compound thereof may be used singly or compositely. More specifically, the material may be selected from known materials for the reflective layers such as Au, Ag, Cu, Al, and Pd. The reflective layer is preferably formed as a thin film with a thickness of 20 to 200 nm.

The second dielectric layer (52), the phase-change recording material layer (4), and the first dielectric layer (51) are deposited in this order by sputtering process on the reflective layer (3), or on the supporting substrate (20) in the case that no reflective layer is provided.

The phase-change recording material layer (4) is formed of a material changing reversibly by irradiation of laser beam between the crystalline state and the amorphous state, and exhibiting different optical properties between these states. Examples of such material include Ge—Sb—Te, In—Sb—Te, Sn—Se—Te, Ge—Te—Sn, In—Se—Ti, and In—Sb—Te. Further, to any such matrial, a trace of at least one metal selected from Co, Pt, Pd, Au, Ag, Ir, Nb, Ta, V, W, Ti, Cr, Zr, Bi, In and the like may be added. A trace of reductive gas such as nitrogen also may be added. There is no limitation to the thickness of the recording material layer (4), which is for example in a range of about 3 to 50 nm.

The second dielectric layers (52) and the first dielectric layer (51) are formed on the top and under surfaces of the recording material layer (4), respectively, so as to sandwich the same. The second dielectric layers (52) and the first dielectric layer (51) have not only a function of protecting the recording material layer (4) mechanically and chemically but also a function as an interference layer for adjusting the optical properties. The second dielectric layers (52) and the first dielectric layer (51) may each consist of either a single layer or a plurality of layers.

The second dielectric layers (52) and the first dielectric layer (51) is preferably formed of an oxide, a nitride, a sulfide, or a fluoride or a composite thereof, containing at least one metal selected from Si, Zn, Al, Ta, Ti, Co, Zr, Pb, Ag, Zn, Sn, Ca, Ce, V, Cu, Fe, and Mg. Further, the second dielectric layers (52) and the first dielectric layer (51) preferably have an extinction coefficient k of 0.1 or less.

There is no limitation to the thickness of the second dielectric layer (52), which is preferably for example in a range of about 20 to 150 nm. There is no limitation to the thickness of the first dielectric layer (51), either, which is preferably for example in a range of about 20 to 200 nm. Setting the thicknesses of the second dielectric layers (52) and the first dielectric layer (51) in these ranges makes it possible to adjust reflection.

The light transmitting layer (7) is formed on the first dielectric layer (51) by using active energy ray-curable material, or light-transmitting sheet such as a polycarbonate sheet.

The active energy ray-curable material for the light transmitting layer (7) should be optically transparent, exhibit low optical absorption or reflection in the laser wavelength range to be used, and have low birefringence, and is selected from ultraviolet ray-curable materials and electron ray-curable materials on these conditions.

Specifically, the active energy ray-curable material is constituted preferably of the ultraviolet ray- (electron ray-) curable compound or its composition for polymerization. Examples include monomers, oligomers, polymers and the like in which groups to be crosslinked or polymerized by irradiation with ultraviolet rays, such as acrylic type double bonds such as in ester compounds of acrylate and methacrylate, epoxy acrylates and urethane acrylates, allyl type double bonds such as in diallyl phthalate, and unsaturated double bonds such as in maleic acid derivatives and the like have been contained or introduced into a molecule. These are preferably polyfunctional, particularly trifunctional or more, and may be used alone or in combination thereof. While monofunctional ones may be used for necessary.

The ultraviolet ray-curable monomer is preferably a compound with a molecular weight of less than 2000, and the oligomer is preferably a compound with a molecular weight of 2000 to 10000. These include styrene, ethyl acrylate, ethylene glycol diacrylate, ethylene glycol dimethacrylate, diethylene glycol diacrylate, diethylene glycol methacrylate, 1,6-hexanediol diacrylate, 1,6-hexanediol dimethacrylate etc., and particularly preferable examples include pentaerythritol tetra(meth)acrylate, pentaerythritol tri(meth) acrylate, trimethylolpropane tri(meth)acrylate, trimethylolpropane di(meth)acrylate, (meth)acrylate of phenol ethylene oxide adduct, etc. Besides, the ultraviolet ray-curable oligomer includes oligoester acrylate, acrylic modified urethane elastomer etc.

The ultraviolet ray- (electron ray-) curable material may contain known photopolymerization initiators. The photopolymerization initiator is not particularly necessary when electron rays are used as the active energy rays. However, when ultraviolet rays are used, the initiator is necessary. The photopolymerization initiator may be properly selected from the usual photopolymerization initiators such as acetophenone, benzoin, benzophenone, thioxanthone. Examples of a radical photo initiator, among the photopolymerization initiators, include DAROCURE 1173, IRGACURE 651, IRGACURE 184, and IRGACURE 907 (all of which are products manufactured by Ciba Specialty Chemicals Inc.). The content by percentage of the photopolymerization initiator is, for example, from about 0.5 to 5% by weight with respect to the ultraviolet ray- (electron ray-) curable component.

As the ultraviolet ray-curable material, a composition containing epoxy compound and a photo-cation polymerization catalyst is also preferably used. The epoxy compound is preferably alicyclic epoxy compound, particularly the compound having 2 or more epoxy groups in the molecule. The alicyclic epoxy compound is preferably one or more of the following compounds: 3,4-epoxycyclohexyl methyl-3,4-epoxycyclohexane carboxylate, bis-(3,4-epoxycyclohexylmethyl) adipate, bis-(3,4-epoxycyclohexyl) adipate, 2-(3,4-epoxycyclohexyl-5,5-spiro-3,4-epoxy) cyclohexane-metha-dioxane, bis(2,3-epoxycyclopentyl) ether and vinyl cyclohexene dioxide etc. Although the epoxy equivalent of alicyclic epoxy compound is not particularly limited, it is preferably 60 to 300, more preferably 100 to 200 for attaining excellent curable properties.

The photo-cation polymerization catalyst used may be any of known ones and is not particularly limited. For example, it is possible to use one or more of the followings: metal fluoroborates and boron trifluoride complexes, bis (perfluoroalkyl sulfonyl) methane metal salts, aryl diazonium compounds, aromatic onium salts of the group 6A elements, aromatic onium salts of the group 5A elements, dicarbonyl chelate of the groups 3A to 5A elements, thiopyrylium salts, the group 6A elements having MF6 anions (M is P, As or Sb), triaryl sulfonium complex salts, aromatic iodonium complex salts, aromatic sulfonium complex salts etc., and it is particularly preferable to use one or more of the followings: polyaryl sulfonium complex salts, aromatic sulfonium salts or iodonium salts of halogen-containing complex ions, and aromatic onium salts of the group 3A elements, the group 5A elements and the group 6A elements. The content by percentage of the photo-cation polymerization catalyst is, for example, from about 0.5 to 5% by weight of the ultraviolet ray-curable component.

The active energy ray-curable material used for the light transmitting layer preferably has a viscosity of 1000 to 10000 cp (at 25° C.).

In the formation of the light-transmitting layer (7), the application of the active energy ray-curable material onto the surface of the first dielectric layer (51) is preferably conducted using a spin coating method. Following application, this curable material can then be cured by irradiation with ultraviolet rays. This ultraviolet-ray irradiation may be divided into a plurality of irradiation doses. Furthermore, the operation of applying the active energy ray-curable material may also be conducted using a plurality of application repetitions, with ultraviolet-ray irradiation conducted after each individual application repetition. By dividing the ultraviolet-ray irradiation operation into a plurality of irradiation doses, the resin is able to be cured in a stepwise manner, thus enabling a reduction in the stress that accumulates within the disk at any one time due to curing shrinkage, leading to a reduction in the overall stress accumulated within the disk. As a result, even if the thickness of the light-transmitting layer (7) is considerably large, as in the case described above, a disk with excellent mechanical characteristics can still be produced.

Alternatively, in the present invention, a light-transmitting layer can also be formed using a light transmitting resin sheet. In such a case, an active energy ray-curable material is applied onto the surface of the first dielectric layer (51), in a similar manner to that described above for formation of a light-transmitting layer, thus forming an uncured resin material layer. A light transmitting sheet is then placed on this uncured resin material layer as the light-transmitting layer (7), and by subsequently irradiating the structure with active energy rays such as ultraviolet rays and curing the underlying resin material layer, the light transmitting sheet is bonded to the structure and forms the light-transmitting layer (7). The active energy ray-curable material of this resin material layer preferably has a viscosity of 3 to 500 cp (at 25° C.). Application of the resin material layer is preferably conducted using a spin coating method, and the thickness of the resin material layer, following curing, is typically within a range from 1 to 50 μm.

The light transmitting sheet can use, for example, a polycarbonate sheet with any desired thickness within a range from 30 to 150 μm. More specifically, the formation of the light-transmitting layer (7) involves placing the polycarbonate sheet of the desired thickness on the uncured resin material layer under vacuum conditions (0.1 atmospheres or lower), returning the structure to atmospheric pressure, and then conducting irradiation with ultraviolet rays to cure the resin material layer.

A hard coat agent composition comprising the fluorine-containing block copolymer (A) and the active energy ray-curable compound (B) is applied onto the light-transmitting layer (7), and is then cured by irradiation with active energy rays such as ultraviolet rays, electron rays or visible rays, thereby forming the hard coat layer (8). A description of each of the components of the hard coat agent composition is provided below.

The active energy ray-curable compound (B) is different from the component (A), is the primary curable component in the hard coat agent composition, and is the component responsible for forming the matrix of the hard coat layer obtained after curing. There are no particular restrictions on the structure of the curable compound (B), provided it is a compound that contains at least one active energy ray-polymerizable group selected from the group consisting of (meth)acryloyl group, vinyl group, and mercapto group. In order to ensure a satisfactory level of hardness for the resulting hard coat, the active energy ray-curable compound (B) preferably comprises a polyfunctional monomers or oligomer containing at least two, and preferably three or more, polymerizable groups within each molecule.

Among such active energy ray-curable compounds (B), examples of the compound having (meth)acryloyl group include urethane acrylates, epoxy acrylates, and ester acrylates, and specific examples include 1,6-hexanediol di(meth) acrylate, triethylene glycol di(meth)acrylate, ethylene oxide modified bisphenol A di(meth)acrylate, trimethylolpropane tri(meth)acrylate, pentaerythritol tetra(meth)acrylate, ditrimethylolpropane tetra(meth)acrylate, dipentaerythritol hexa (meth)acrylate, pentaerythritol tri(meth)acrylate, and 3-(meth)acryloyloxyglycerin mono(meth)acrylate. However, the compound having (meth)acryloyl group is not limited to these examples.

Examples of the compound having vinyl group include ethylene glycol divinyl ether, pentaerythritol divinyl ether, 1,6-hexanediol divinyl ether, trimethylolpropane divinyl ether, ethylene oxide modified hydroquinone divinyl ether, ethylene oxide modified bisphenol A divinyl ether, pentaerythritol trivinyl ether, dipentaerythritol hexavinyl ether, and ditrimethylolpropane polyvinyl ether. However, the compound having vinyl group is not limited to these examples.

Examples of the compound having mercapto group include
ethylene glycol bis(thioglycolate),
ethylene glycol bis (3-mercaptopropionate),
trimethylolpropane tris(thioglycolate),
trimethylolpropane tris(3-mercaptopropionate),
pentaerythritol tetrakis(mercaptoacetate),
pentaerythritol tetrakis(thioglycolate),
and pentaerythritol tetrakis(3-mercaptopropionate). However, the compound having mercapto group is not limited to these examples.

As the active energy ray-curable compound (B) contained in the hard coat agent composition, either a single compound or a combination of two or more compounds may be used.

The fluorine-containing block copolymer (A) is used for imparting water repellency and/or lubricity to the surface of the hard coat layer. The fluorine-containing block copolymer (A) comprises a fluorine-containing segment and a hydroxyl group-containing segment.

The fluorine-containing segment is formed either from a fluorine-containing monomer represented by the general formula (1) shown below, or from a fluorine-containing monomer represented by the general formula (1) and a radical polymerizable monomer containing no hydroxyl groups. This fluorine-containing segment imparts water repellency, oil repellency, and/or lubricity to the surface of the hard coat layer.

$$CH_2=CR^1COOR^2Rf \qquad (1)$$

In this formula, $R^1$ represents either a hydrogen atom or a methyl group, $R^2$ represents $-C_pH_{2p}-$, $-C(C_pH_{2p+1})H-$, $-CH_2C(C_pH_{2p+1})H-$ or $-CH_2CH_2O-$, and Rf represents $-C_nF_{2n+1}$, $-(CF_2)_nH$, $-(CF_2)_p OC_nH_{2n}C_iF_{2i+1}$, $-(CF_2)_pOC_mH_{2m}C_iF_{2i}H$, $-N(C_pH_{2p+1})COC_nF_{2n+1}$, or $-N(C_pH_{2p+1})SO_2C_nF_{2n+1}$. Furthermore, p is an integer from 1 to 10, n is an integer from 1 to 16, m is an integer from 0 to 10, and i is an integer from 0 to 16.

Specific examples of fluorine-containing monomers represented by the general formula (1) include: $CF_3(CF_2)_7 CH_2CH_2OCOCH=CH_2$, $CF_3CH_2OCOCH=CH_2$, $CF_3(CF_2)_4CH_2CH_2OCOC(CH_3)=CH_2$, $C_7F_{15}CON(C_2H_5) CH_2OCOC(CH_3)=CH_2$, $CF_3(CF_2)_7SO_2N(CH_3) CH_2CH_2OCOCH=CH_2$, $C_2F_{15}SO_2N(C_3H_7) CH_2CH_2OCOC(CH_3)=CH_2$, $(CF_3)_2CF(CF_2)_6(CH_2)_3 OCOCH=CH_2$, $(CF_3)_2CF(CF_2)_{10}(CH_2)_3OCOC(CH_3) =CH_2$, $CF_3(CF_2)_4CH(CH_3)OCOC(CH_3)=CH_2$, $CF_3CH_2OCH_2CH_2OCOCH=CH_2$, $C_2F_5(CH_2CH_2O)_2 CH_2OCOCH=CH_2$, $(CF_3)_2CFO(CH_2)_5OCOCH=CH_2$, $CF_3(CF_2)_4OCH_2CH_2OCOC(CH_3)=CH_2$, $C_2F_5CON(C_2H_5) CH_2OCOCH=CH_2$, $CF_3(CF_2)_2CON(CH_3)CH(CH_3) CH_2OCOCH=CH_2$, $H(CF_2)_6C(C_2H_5)OCOC(CH_3)=CH_2$, $H(CF_2)_8CH_2OCOCH=CH_2$, $H(CF_2)_4CH_2OCOCH=CH_2$, $H(CF_2)_6CH_2OCOC(CH_3)=CH_2$, $CF_3(CF_2)_7SO_2N(CH_3) CH_2CH_2OCOC(CH_3)=CH_2$, $CF_3(CF_2)_7SO_2N(CH_3) (CH_2)_0 OCOCH=CH_2$, $C_2F_5SO_2N(C_2H_5)CH_2CH_2OCOC (CH_3)=CH_2$, $CF_3(CF_2)_7SO_2N(CH_3)(CH_2)_4 OCOCH=CH_2$, and $C_2F_5SO_2N(C_2H_5)C(C_2H_5) HCH_2OCOCH=CH_2$. These monomers can either be used singularly, or in a combination of two or more different monomers.

Specific examples of the aforementioned radical polymerizable monomer containing no hydroxyl groups include methyl (meth)acrylate, ethyl (meth)acrylate, propyl (meth) acrylate, butyl (meth)acrylate, cyclohexyl (meth)acrylate, stearyl (meth)acrylate, lauryl (meth)acrylate, methoxyethyl (meth)acrylate, ethoxyethyl (meth)acrylate, N,N-diethylaminoethyl (meth)acrylate, N,N-dimethylaminoethyl (meth)acrylate, and tetrahydrofurfuryl (meth) acrylate. These monomers can also be used either singularly, or in a combination of two or more different monomers.

On the other hand, the hydroxyl group-containing segment has the effect of improving the compatibility with the polymer of the active energy ray-curable compound (B). The hydroxyl group-containing segment may be formed from a radical polymerizable monomer containing a hydroxyl group. Examples of radical polymerizable monomers containing a hydroxyl group include 2-hydroxyethyl (meth) acrylate, ethylene glycol mono(meth)acrylate, 2-hydroxypropyl (meth)acrylate, 2-hydroxy-3-methoxypropyl (meth) acrylate, 2-hydroxy-3-butoxypropyl (meth)acrylate, 2-hydroxy-3-(2-ethylhexyloxy)propyl (meth)acrylate, and 2-hydroxy-3-phenyloxypropyl (meth)acrylate. These monomers can either be used singularly, or in a combination of two or more different monomers.

Synthesis of the fluorine-containing block copolymer (A) can be conducted using any of a variety of known methods, by conducting a typical two-step bulk polymerization, suspension polymerization, solution polymerization, or emulsion polymerization, using either a polymeric peroxide or a polyazo compound.

The weight ratio (f/h) between the fluorine-containing segment (f) and the hydroxyl group-containing segment (h) in the fluorine-containing block copolymer (A) is preferably within a range from 10/90 to 90/10, and even more preferably from 20/80 to 80/20. If the proportion of the fluorine-containing segment (f) exceeds 90% by weight, then the compatibility of the hard coat deteriorates, and the effect of entanglement of the active energy ray-curable compound (B) weakens, leading to poorer durability. In contrast if the proportion of the fluorine-containing segment (f) is less than 10% by weight, then the water and oil repellency properties are unsatisfactory, and the effects of the fluorine cannot be adequately manifested.

In addition, in order to improve the level of fixation within the hard coat layer, the fluorine-containing block copolymer (A) is preferably a copolymer in which an active energy ray-reactive group has been introduced into the hydroxyl group-containing segment via a urethane linkage. If such an active energy ray-reactive group is introduced, then the active energy ray irradiation conducted during curing of the hard coat causes crosslinking reactions between molecules of the fluorine-containing block copolymer (A), and between the fluorine-containing block copolymer (A) and the active energy ray-curable compound (B), thus improving the fixation of the compound (A) within the hard coat layer. As a result, a medium is obtained that displays extremely superior anti-staining properties and lubricity over a wide range of storage conditions and usage conditions. Examples of the active energy ray-reactive group include (meth) acryloyl group and vinyl group.

In the fluorine-containing block copolymer (A), a monomer containing one ethylenic unsaturated double bond and one isocyanate group within each molecule is preferably reacted with the hydroxyl group-containing segment to introduce an ethylenic unsaturated double bond via a urethane linkage derived from the hydroxyl group and the isocyanate group. A fluorine-containing block copolymer (A) containing an active energy ray-reactive double bond that has been introduced in this manner is able to suppress any increase in viscosity of the liquid of the hard coat agent composition.

Examples of this monomer include isocyanatoethyl (meth)acrylate and methacryloyl isocyanate.

In terms of the effects of the fixation within the hard coat layer and others, the molecular weight of the fluorine-containing block copolymer (A) is preferably within a range from about 5,000 to 100,000. At molecular weights of less than 5,000, a satisfactory fixation effect is difficult to achieve in those cases where the copolymer contains no active energy ray-reactive double bonds. If the molecular weight exceeds 100,000, then the solubility of the copolymer in the hard coat liquid deteriorates, and migration of the copolymer to the surface of the layer following application becomes less efficient.

Specific examples of the fluorine-containing block copolymer (A) include MODIPER-F220, F600, F2020, and F3035 (manufactured by NOF Corporation), and copolymers in which (meth)acryloyl groups or vinyl groups have been introduced into these commercially available copolymers are preferred, as well as copolymers in which (meth)acryloyl groups have been introduced via urethane linkages.

The fluorine-containing block copolymer (A) contained in the hard coat agent composition may be either a single copolymer or a combination of two or more different copolymers.

The hard coat agent composition preferably comprises 0.1 part by weight or more and 10 parts by weight or less, and even more preferably 0.5 part by weight or more and 5 parts by weight or less, of the fluorine-containing block copolymer (A) per 100 parts by weight of the nonvolatile content of the composition. If the quantity of the fluorine-containing block copolymer (A) is more than 10 parts by weight, then although the lubricity improves, the hardness of the hard coat layer tends to decrease, whereas in contrast, if the quantity is less than 0.1 part by weight, the lubricity improvement effect is minimal. The term "nonvolatile content" refers to those components that remain in the hard coat layer following curing, and includes not only the fluorine-containing block copolymer (A) and the curable compound (B), but also optional components such as the inorganic fine particles (C) described below, photopolymerization initiators, and a variety of other additives.

In addition, the hard coat agent composition preferably also comprises inorganic fine particles (C) with an average particle size of not more than 100 nm. In order to ensure good transparency of the hard coat layer, the average particle size of these inorganic fine particles (C) is typically not more than 100 nm, and preferably not more than 20 nm, and from the viewpoint of the restrictions associated with producing a colloid solution, is preferably at least 5 nm.

The inorganic fine particles (C) may, for example, be fine particles of metal (or semi-metal) oxides, or fine particles of metal (or a semi-metal) sulfides. Examples of the metals or semi-metals for the inorganic fine particles include Si, Ti, Al, Zn, Zr, In, Sn, and Sb. Aside from the oxides and sulfides, the inorganic fine particles (C) may include selenides, tellurides, nitrides, and carbides. Examples of the inorganic fine particles include fine particles of silica, alumina, zirconia, and titania. Of these, silica fine particles are preferred. When added to the hard coat agent composition, such inorganic fine particles enhance the abrasion resistance of the hard coat layer.

The silica fine particles are preferably surface-modified with a hydrolyzable silane compound containing active energy ray-reactive groups. Such reactive silica fine particles undergo a crosslinking reaction when exposed to active energy rays during curing of the hard coat and are fixed in the polymer matrix. One example of such reactive silica fine particles is the one described in Japanese Laid-Open Patent Publication No. 9-100111(1997), which is suitable for use in the present invention.

In those cases where inorganic fine particles (C) are used, the hard coat agent composition preferably comprises 5 parts by weight or more and 500 parts by weight or less of the inorganic fine particles (C), and even more preferably 20 parts by weight or more and 200 parts by weight or less of the inorganic fine particles (C), per 100 parts by weight of the active energy ray-curable compound (B). If more than 500 parts by weight of the inorganic fine particles (C) is added, then the film strength of the hard coat layer tends to weaken, whereas if the quantity is less than 5 parts by weight, the level of improvement in the abrasion resistance of the hard coat layer achieved by adding the inorganic fine particles (C) is minimal.

The hard coat agent composition may also comprise known photopolymerization initiators. The photopolymerization initiator is not particularly necessary when electron rays are used as the active energy rays. However, when ultraviolet rays are used, the initiator is necessary. The photopolymerization initiator may be properly selected from the usual photopolymerization initiators such as acetophenone, benzoin, benzophenone, thioxanthone. Examples of a radical photo initiator, among the photopolymerization initiators, include DAROCURE 1173, IRGACURE 651, IRGACURE 184, and IRGACURE 907 (all of which are products manufactured by Ciba Specialty Chemicals Inc.). The content by percentage of the photopolymerization initiator added to the hard coat agent composition is, for example, from about 0.5 to 5% by weight with respect to the total amount of the aforementioned components (A), (B), and (C).

Furthermore, if required, the hard coat agent composition may also comprise other additives such as a non-polymerizable diluent, an organic filler, a polymerization inhibitor, an antioxidant, an ultraviolet ray absorber, a photo-stabilizer, an antifoamer, and a leveling agent.

In the present invention, the hard coat agent composition is applied onto the light-transmitting layer (7), thus forming an uncured hard coat layer, and this uncured layer is then irradiated with active energy rays, thereby curing the uncured layer and forming the hard coat layer (8).

The coating method for the application is not limited, and may be any one of various coating methods such as spin coating, dip coating and gravure coating methods. In an alternate method in which a light-transmitting sheet is used to serve as the light-transmitting layer (7), the hard coat layer (8) is first formed onto an elongate raw light-transmitting sheet as described above, and disks are subsequently stamped out from the raw sheet. In the same manner as described above, the disks are placed on the uncured resin material layer and the uncured resin material layer is cured.

When the hard coat agent composition contains the non-reactive organic diluent, the hard coat agent composition is first applied to form an uncured hard coat layer, which is then dried by heating to remove the non-reactive organic solvent. Subsequently, the active energy rays are irradiated to cure the uncured layer and to thereby form the hard coat layer (8). By first applying the hard coat agent composition using the organic diluent and then removing the organic solvent by heating and drying, the fluorine-containing block copolymer (A) tends to concentrate in the proximity of the surface of the uncured hard coat layer. The result is more fluorine-containing block copolymer existing in the proximity of the surface of the cured hard coat layer (8). This further enhances the lubricity. The heating/drying process is preferably carried out at a temperature of for example 40° C. or more and 100° C. or less and over a time period of for example 30 seconds or more and 8 minutes or less, preferably 1 minute or more and 5 minutes or less, and more preferably 3 minutes or more and 5 minutes or less. Examples of the non-reactive organic diluent include, but are not limited to, propyleneglycol monomethylether acetate, propyleneglycol monomethylether, ethyleneglycol monomethylether butylacetate, methyl ethyl ketone, methyl isobutyl ketone, and isopropyl alcohol. The active energy rays may be properly selected from ultraviolet rays, electron rays, visible rays, and other proper active energy rays. Preferably, ultraviolet rays or electron rays are used. The thickness of the hard coat (8) after curing is adjusted to about 0.5 to 5 μm.

In this manner, a phase-change type optical recording disk such as that shown in FIG. 2 may be produced, which represents an example of an optical information medium in which the film element-side surface acts as the surface upon which the recording/reproducing beam is incident.

2. Optical Information Media in Which the Supporting Substrate-Side Surface Acts as the Surface Upon Which the Recording/Reproducing Beam is Incident:

Next an optical information medium, in which the supporting substrate-side surface acts as the surface upon which the recording/reproducing beam is incident, will be described.

Figure 3:
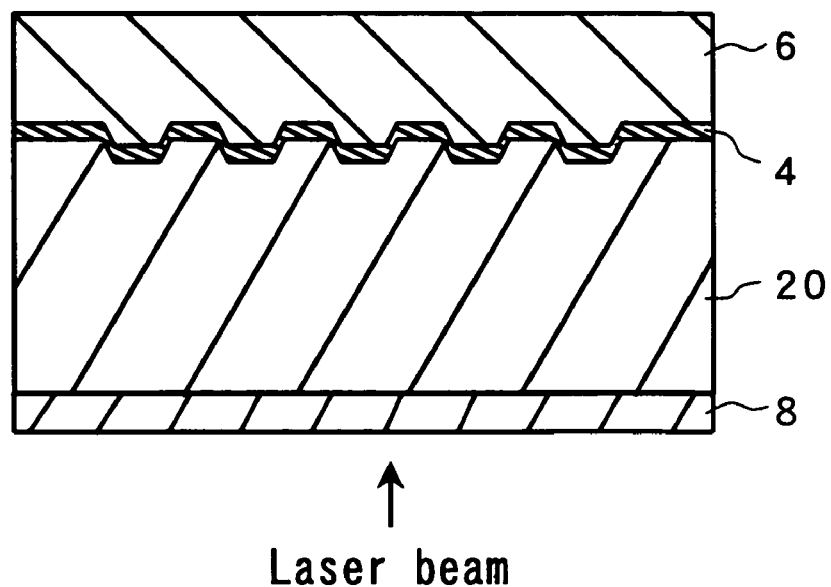
FIG. 3 is a schematic cross-sectional view showing another example of the layer structure of an optical disk of the present invention.

FIG. 3 is a schematic cross-sectional view showing another example of the layer structure of an optical disk of the present invention. The optical disk shown in FIG. 3 comprises an information recording layer (4) on one surface of a light transmitting supporting substrate (20), and a protective layer (6) on the information recording layer (4), whereas a light transmitting hard coat layer (8) is formed on the other surface of the supporting substrate (20). The hard coat layer (8) acts as the surface upon which the recording/reproducing beam is incident, and the laser beam for recording or reproducing is incident through the hard coat layer (8) and the supporting substrate (20), and onto the recording layer (4).

Figure 4:
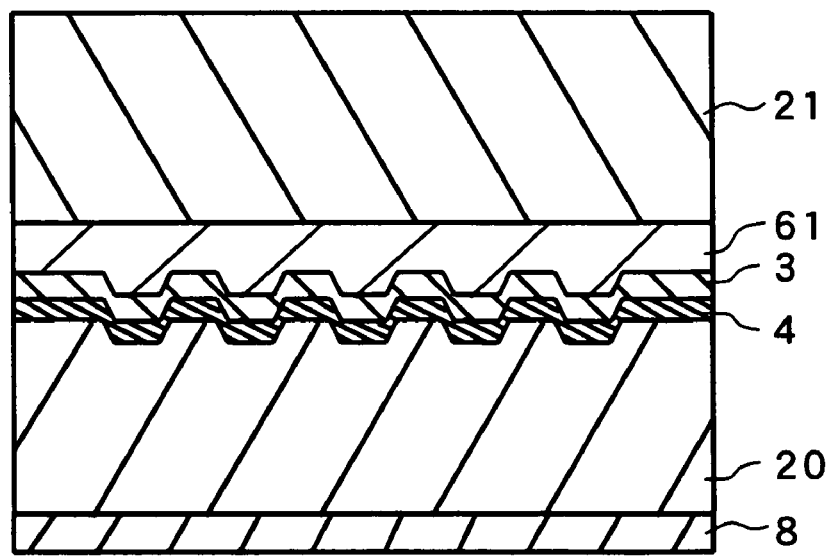
FIG. 4 is a schematic cross-sectional view showing yet another example of the layer structure of an optical disk of the present invention.

FIG. 4 is a schematic cross-sectional view showing yet another example of the layer structure of an optical disk of the present invention. The optical recording disk shown in FIG. 4 comprises an organic dye layer (4) on one surface of a light transmitting supporting substrate (20), a reflective layer (3) on the dye layer (4), and another supporting substrate (21) that is bonded to the reflective layer (3) via a protective and adhesive layer (61), whereas a light transmitting hard coat layer (8) is formed on the other surface of the supporting substrate (20) The hard coat layer (8) acts as the surface upon which the recording/reproducing beam is incident. In this example, the dye layer (4) and the reflective layer (3) make up the information recording layer. An example of this type of optical disk is the write-once DVD-R format.

In addition to the write-once DVD-R disk shown in FIG. 4, a variety of other disk formats, including read-only DVD-ROM, and rewritable formats such as DVD-RAM and DVD-RW and the like can be commercially available. Read-only DVD formats include DVD-video and DVD-ROM, and with these types of optical disks, concavities-convexities known as pits, which are used to record the information signals, are formed in the surface of the light transmitting supporting substrate during production of the substrate, and a metal reflective layer such as Al, and then a protective layer, are formed sequentially on the supporting substrate. A separate supporting substrate is then bonded to the protective layer via an adhesive layer, thus completing the optical disk. In the case of rewritable DVD formats, the information recording layer may be formed in the same manner as for the phase-change type recording medium described above in the section 1.

The supporting substrate (20) uses a light transmitting base material. Conventionally, the light transmitting supporting substrate (20) is formed by injection molding of a polycarbonate resin, with information formed in the surface of the resin as a series of prepits or pregrooves. However, other materials may also be used, and resins such as polyolefin resins can also be favorably employed. Alternatively, the supporting substrate can also be formed from a flat glass plate, by using the 2P method to form a series of prepits or pregrooves.

A solution of an organic dye dissolved in a solvent is applied onto the surface of the supporting substrate (20) using spin coating, and is then dried to form an organic dye layer (4) of the desired thickness. The organic dye can be selected from amongst the various cyanine dyes, azo dyes, and phthalocyanine dyes or the like. Techniques other than spin coating, such as spray methods, screen printing methods or vacuum deposition methods can also be used for forming the dye layer, and the thickness of the layer formed can be suitably adjusted in accordance with the dye used.

In those cases where spin coating is used, the dye component is dissolved in a solvent and used in the form of an organic dye solution. The solvent should be a solvent that is capable of satisfactorily dissolving the dye, without having any deleterious effects on the light transmitting base material. The concentration of the dye solution is preferably within a range from 0.01 to 10% by weight.

Specific examples of suitable solvents include alcohol based solvents such as methanol, ethanol, isopropyl alcohol, octafluoropentanol, allyl alcohol, methyl cellosolve, ethyl cellosolve, and tetrafluoropropanol; aliphatic or alicyclic hydrocarbon based solvents such as hexane, heptane, octane, decane, cyclohexane, methylcyclohexane, ethylcyclohexane, and dimethylcyclohexane; aromatic hydrocarbon based solvents such as toluene, xylene, and benzene; halogenated hydrocarbon based solvents such as carbon tetrachloride, chloroform, tetrachloroethane, and dibromoethane; ether based solvents such as diethyl ether, dibutyl ether, diisopropyl ether, and dioxane; ketone based solvents such as 3-hydroxy-3-methyl-2-butanone; ester based solvents such as ethyl acetate and methyl lactate; and water, and of these, a solvent that does not attack the substrate base material should be used. These solvents can either be used singularly, or in combinations of two or more different solvents.

There are no particular restrictions on the thickness of the organic dye layer, although values from about 10 to 300 nm are preferred, and values from about 60 to 250 nm are particularly desirable.

A reflective layer (3) is provided on the organic dye layer (4). The material for the reflective layer must be a material with a satisfactorily high reflectance at the wavelength of the reproducing beam, and suitable examples include metal elements such as Au, Ag, Cu, Al, Ni, Pd, Cr, and Pt, as well as alloys of these metals. Furthermore, the elements listed below may also be included. Namely, metals and semi-metals such as Mg, Se, Hf, V, Nb, Ru, W, Mn, Re, Fe, Co, Rh, Ir, Zn, Cd, Ga, In, Si, Ge, Te, Pb, Po, Sn, and Bi.

The reflective layer can be formed using a sputtering method, ion plating method, chemical deposition method, or vacuum deposition method, although this is not a restrictive list. Furthermore, a conventional inorganic or organic intermediate layer or adhesive layer may be provided between the substrate base material and the reflective layer in order to improve the reflectance and/or improve the recording characteristics of the disk. There are no particular restrictions on the thickness of the reflective layer, although values from about 10 to 300 nm are preferred, and values from about 80 to 200 nm are particularly desirable.

Another supporting substrate (21) is usually bonded to the reflective layer (3) via a protective and adhesive layer (61). This supporting substrate (21) can use the same material as that used for the supporting substrate (20). There are no particular restrictions on the material used for the adhesive layer (61), provided it is capable of bonding the two substrates (21) and (20) together, and protects the reflective layer from external forces, and conventional organic or inorganic materials can be used. Examples of suitable organic materials include thermoplastic resins, thermosetting resins, and ultraviolet ray-curable resins. Furthermore, examples of suitable inorganic materials include $SiO_2$, $SiN_4$, $MgF_2$, and $SnO_2$. Adhesive layers of thermoplastic resins or thermosetting resins can be formed by dissolving the resin in an appropriate solvent, applying the resin in solution form, and then drying the applied solution. Ultraviolet ray-curable resins can either be applied as is, or dissolved in an appropriate solvent to prepare the solution for application, and then applied the solution, and the applied film is then irradiated with ultraviolet rays to cure the resin and generate the layer. Examples of suitable ultraviolet ray-curable resins include acrylate resins such as urethane acrylate, epoxy acrylate, and polyester acrylate. These materials can be used singularly, or in combinations of two or more materials, and can be formed as either a single layer, or a multilayered film.

Formation of the protective and adhesive layer (61) is conducted using either a application method such as the spin coating method used in forming the recording layer or a casting method, or a different method such as sputtering or chemical deposition.

Furthermore, the adhesive used in the bonding step can use any of a variety of different adhesives, including hot melt adhesives, ultraviolet ray-curable adhesives, heat curable adhesives, and tacky type adhesives, and is applied using a method that is appropriate for the type of adhesive, such as roll coating, screen printing or spin coating, although in the case of DVD-R disks, on the basis of factors such as workability, productivity, and the resulting disk characteristics, an ultraviolet ray-curable adhesive is preferably applied using either a screen printing or spin coating method.

A light transmitting hard coat layer (8) is formed on the other surface of the supporting substrate (20). The material for the hard coat layer (8), and the method used for forming the layer are as described above in the section 1. The hard coat layer (8) acts as the surface upon which the recording/reproducing beam is incident. The recording/reproducing beam uses a laser beam with a wavelength of 650 or 660 nm. A blue laser beam can also be used.

In the manner described above, a DVD-R disk such as that shown in FIG. 4 may be produced, which represents an example of an optical information medium in which the supporting substrate-side surface acts as the surface upon which the recording/reproducing beam is incident.

EXAMPLES

The present invention will now be described in detail with reference to examples, which are not intended to limit the scope of the invention in any way.

Synthesis Example for a Fluorine-Containing Block Copolymer 1

A round bottom flask equipped with a stirrer was charged with 20 parts by weight of a fluorine-containing acrylic block copolymer (brand name: MODIPER-F600, manufactured by NOF Corporation), and 80 parts by weight of propyleneglycol-1-monomethylether-2-acetate, and the mixture was stirred gently.

Once the fluorine-containing acrylic block copolymer had dissolved, 4.6 parts by weight of 2-isocyanatoethyl methacrylate, 0.003 part by weight of hydroquinone, and 0.004 part by weight of tin octanoate were added, and the temperature was raised to 75° C. with constant stirring. The reaction was allowed to proceed for 6 hours, and the reaction mixture was then cooled to room temperature, yielding a solution (copolymer 1) comprising a solid content of 23% by weight.

The thus obtained solution was applied onto a release paper and dried under reduced pressure to form a film, and when this film was analyzed using infrared spectroscopic analysis, the peak derived from O—H stretching vibration that had been observed at 3520 $cm^{-1}$ in the fluorine-containing acrylic block copolymer prior to reaction had disappeared, whereas the peak derived from N—H stretching vibration had appeared at 3390 $cm^{-1}$. Furthermore, a peak derived from the adjacent double bond stretching vibration of an NCO group was not observed at 2270 $cm^{-1}$.

When a small quantity of an organic peroxide such as benzoyl peroxide was added to the obtained solution, and the solution was then heated to 70° C., the entire solution was converted to a gel-like solid. From the above findings it was evident that the hydroxyl group of the fluorine-containing acrylic block copolymer and the isocyanate group of the 2-isocyanatoethyl methacrylate had reacted together to form a urethane linkage, thus introducing methacrylate group, which is capable of crosslinking via a radical polymerization, into a side chain of the fluorine-containing acrylic block copolymer.

Example 1

An optical recording disk sample with the layer structure shown in FIG. 2 was produced as follows.

Using a disk shaped supporting substrate (20) (formed from polycarbonate, diameter 120 mm, thickness 1.1 mm) in which information recording grooves had been formed, sputtering was used to form a reflective layer (3) of thickness 100 nm comprising $Al_{98}Pd_1Cu_1$ (atomic ratio) on the groove-side surface of the substrate. The depth of the grooves, which is represented by light-path length at a wavelength λ=405 nm, was set into λ/6. The recording track pitch in the groove-recording scheme was set into 0.32 μm.

Subsequently, sputtering with an $Al_2O_3$ target was used to form a second dielectric layer (52) of thickness 20 nm on the surface of the reflective layer (3). Sputtering using an alloy target comprising a phase-changing material was then used to form a recording layer (4) of thickness 12 nm on the surface of the second dielectric layer (52). The composition (atomic ratio) of the recording layer (4) was $Sb_{74}Te_8$ $(Ge_7In_1)$. Sputtering with a ZnS (80 mol %)-$SiO_2$ (20 mol %) target was then used to form a first dielectric layer (51) of thickness 130 nm on the surface of the recording layer (4).

Subsequently, a radical polymerizable, ultraviolet ray-curable material with the composition shown below was applied onto the surface of the first dielectric layer (51) by spin coating, and was then irradiated with ultraviolet rays under conditions including a use of high pressure mercury lamp (160 W/cm) in an air atmosphere, a separation between the lamp and the applied layer of 11 cm, and a total energy of 3 J/cm$^2$, thus forming a light transmitting layer (7) with a cured thickness of 98 μm.

(Light Transmitting Layer: Composition of the Ultraviolet Ray-Curable Material)

| | |
|---|---|
| Urethane acrylate oligomer (DIABEAM UK6035, manufactured by Mitsubishi Rayon Co., Ltd.) | 50 parts by weight |
| Isocyanuric acid EO modified triacrylate (ARONIX M315, manufactured by Toagosei Co., Ltd.) | 10 parts by weight |
| Isocyanuric acid EO modified diacrylate (ARONIX M215, manufactured by Toagosei Co., Ltd.) | 5 parts by weight |
| Tetrahydrofurfuryl acrylate | 25 parts by weight |
| Photopolymerization initiator (1-hydroxycyclohexyl phenyl ketone) | 3 parts by weight |

Subsequently, an ultraviolet ray-curable/electron ray-curable hard coat agent with the composition shown below was applied onto the light transmitting layer (7) by spin coating to form a coating, and the applied coating was then heated at 60° C. for 3 minutes in an atmosphere to remove the diluent in the coating, and then irradiated with electron rays under nitrogen flow, thus curing the hard coat layer (8). The electron ray irradiation was conducted using a Min-EB electron rays irradiating device (manufactured by Toyo Ink Manufacturing Co., Ltd.), under conditions including an electron ray accelerating voltage of 50 kV and an irradiation dose of 100 kGy. The oxygen concentration of the irradiation atmosphere was 80 ppm. The thickness of the hard coat layer (8) after curing was 2 μm.

(Composition of the Hard Coat Agent)

| | |
|---|---|
| Reactive group modified colloidal silica (dispersion medium: propyleneglycolmonomethylether acetate, nonvolatile content: 40% by weight) | 100 parts by weight |
| Dipentaerythritol hexaacrylate | 48 parts by weight |
| Tetrahydrofurfuryl acrylate | 12 parts by weight |
| Propyleneglycol monomethylether acetate (unreactive diluent) | 40 parts by weight |
| The fluorine-containing block copolymer 1 | 13 parts by weight |

In this manner, a disk sample was prepared.

Example 2

In the formation of the hard coat layer (8), with the exceptions of adding 3 parts by weight of 1-hydroxycyclohexyl phenyl ketone as a photopolymerization initiator to the hard coat agent, and conducting the curing process by irradiation with ultraviolet rays, under the conditions described below, instead of by irradiation with electron rays, a disk sample was prepared in the same manner as the example 1.

Type: high pressure mercury lamp (160 W/cm), total energy: 3 J/cm$^2$, separation between the lamp and the applied layer: 11

Example 3

With the exception of replacing the 13 parts by weight of the fluorine-containing block copolymer 1 in the composition of the hard coat agent with 3 parts by weight of MODIPER-F600 (manufactured by NOF Corporation, nonvolatile content: 100%), a disk sample was prepared in the same manner as the example 2.

Comparative Example 1

With the exception of replacing the 13 parts by weight of the fluorine-containing block copolymer 1 in the composition of the hard coat agent with 0.5 parts by weight of a fluorine based non-crosslinking surfactant FLUORAD FC-4430 (manufactured by Sumitomo 3M Ltd.), a disk sample was prepared in the same manner as the example 2.

Comparative Example 2

With the exception of replacing the 13 parts by weight of the fluorine-containing block copolymer 1 in the composition of the hard coat agent with 3 parts by weight of a fluorine based crosslinking surfactant M-1820 (from Daikin Chemicals Sales Corporation), a disk sample was prepared in the same manner as the example 2.

Comparative Example 3

With the exception of replacing the 13 parts by weight of the fluorine-containing block copolymer 1 in the composition of the hard coat agent with a mixture of 0.5 parts by weight of the fluorine based non-crosslinking surfactant FLUORAD FC-4430 (manufactured by Sumitomo 3M Ltd.) and 2 parts by weight of a fluorine based crosslinking surfactant Viscoat 8F (manufactured by Osaka Organic Chemical Industry Ltd.), a disk sample was prepared in the same manner as the example 2.

Comparative Example 4

With the exception of replacing the 13 parts by weight of the fluorine-containing block copolymer 1 in the composition of the hard coat agent with 10 parts by weight of the fluorine based non-crosslinking surfactant FLUORAD FC-4430 (manufactured by Sumitomo 3M Ltd.), a disk sample was prepared in the same manner as the example 2.

Comparative Example 5

With the exception of replacing the 13 parts by weight of the fluorine-containing block copolymer 1 in the composition of the hard coat agent with 10 parts by weight of the fluorine based crosslinking surfactant M-1820 (from Daikin Chemicals Sales Corporation), a disk sample was prepared in the same manner as the example 2.

Evaluations of the Disk Samples

Each of the disk samples prepared in the examples 1 to 3 and the comparative examples 1 to 5 was subjected to the performance tests described below.

(Evaluation of the Anti-Staining Property and the Durability of that Property)

The contact angle was measured for the hard coat surface of each disk sample. Pure water was used as the measuring liquid, and the static contact angle was measured using a Face Contact-Angle meter manufactured by Kyowa Interface Science Co., Ltd. The measurements were conducted under conditions including a temperature of 20° C. and a relative humidity of 60%. First, the initial contact angle (a) was measured.

Subsequently, in order to evaluate the durability of the anti-staining property, the contact angle (b) after storage at high temperature, the contact angle (c) after wiping with a solvent, and the contact angle (d) after wiping with a solvent following storage at high temperature were also measured.

In the case of the contact angle (b) after storage at high temperature, each disk sample was stored at 80° C. (under dry conditions) for 500 hours, and the contact angle was then remeasured under the same conditions as those described above.

In the case of the contact angle (c) after wiping with a solvent, anon-woven cloth (Bemcot Lint-Free CT-8, manufactured by Asahi Kasei Co., Ltd.) was impregnated with acetone, and was then pressed against the hard coat surface of each disk sample with a load of 1000 g/cm$^2$, and was reciprocated 100 times to be slid on the hard coat surface, before the contact angle was remeasured under the same conditions as those described above.

In the case of the contact angle (d) after wiping with a solvent following storage at high temperature, each disk sample was stored at 80° C. (under dry conditions) for 100 hours, and was then subjected to solvent wiping with acetone under the same conditions as those described above, before the contact angle was remeasured under the same conditions as those described above.

Those disk samples that became charged as a result of the friction between the disk sample surface and the non-woven cloth during the acetone wiping were thoroughly discharged prior to the contact angle measurements.

(Evaluation of Hardness)

The pencil hardness of the hard coat surface of each disk sample was measured in accordance with JIS K5400.

The results from the above measurements are shown in Table 1.

From Table 1 it is evident that each of the disk samples of the examples 1 to 3 displayed excellent anti-staining properties and durability of those properties, while maintaining favorable hardness of the hard coat surface. Particularly, the disk sample of the example 2 displayed excellent surface durability even after exposure to severe test such as the acetone wiping. In addition, the disk sample of the example 1 displayed excellent surface durability even after exposure to even more severe test such as acetone wiping following high temperature storage.

The disk samples of the comparative examples 1 to 5 all showed poor initial anti-staining properties, and as a result, the durability tests (b), (c), and (d) were not conducted. In the comparative examples 4 and 5, because a large quantity of fluorine based surfactant was used, the hardness of the hard coat surface decreased.

In the above examples, a hard coat layer was provided on a phase-change type optical disk. However, the present invention is not restricted to use with optical disks in which the recording layer is a phase-change type layer, and can also be applied to read-only optical disks and write-once optical disks. Accordingly, the above examples represent nothing more than sample illustrations of the invention, and must not be considered limiting in any way. In addition, any modifications which fall within the scope of the appended claims are all considered part of the present invention.

TABLE 1

| | Contact Angle (degrees) | | | | |
|---|---|---|---|---|---|
| Disk | Initial (a) | After high temperature storage (b) | After solvent wiping (c) | After solvent wiping following high temperature storage (d) | Pencil hardness |
| Example 1 | 101 | 100 | 98 | 95 | H |
| Example 2 | 101 | 102 | 90 | 60 | H |
| Example 3 | 100 | 106 | 61 | 60 | H |
| Comparative example 1 | 65 | — | — | — | H |
| Comparative example 2 | 63 | — | — | — | H |
| Comparative example 3 | 65 | — | — | — | H |
| Comparative example 4 | 89 | — | — | — | B |
| Comparative example 5 | 89 | — | — | — | B |

What is claimed is:

1. An optical information medium comprising a film element composed of one or more layers including at least a recording layer or a reflective layer, on a supporting substrate, wherein at least one of the supporting substrate-side surface and the film element-side surface is formed of a hard coat layer comprising a cured product of a hard coat agent composition comprising a fluorine-containing block copolymer (A) and an active energy ray-curable compound (B).

2. The optical information medium according to claim 1, wherein the fluorine-containing block copolymer (A) comprises a fluorine-containing segment and a hydroxyl group-containing segment.

3. The optical information medium according to claim 2, wherein the fluorine-containing block copolymer (A) is a copolymer in which an active energy ray-reactive group has been introduced into the hydroxyl group-containing segment.

4. The optical information medium according to claim 2, wherein the fluorine-containing block copolymer (A) is a copolymer in which an active energy ray-reactive group has been introduced into the hydroxyl group-containing segment via a urethane linkage.

5. The optical information medium according to claim 2, wherein the fluorine-containing block copolymer (A) is a copolymer in which, into the hydroxyl group-containing segment, a monomer containing one ethylenic unsaturated double bond and one isocyanate group within each molecule has been introduced via a urethane linkage derived from the hydroxyl group and the isocyanate group.

6. The optical information medium according to claim 1, wherein the hard coat agent composition comprises 0.1 part by weight or more and 10 parts by weight or less of the fluorine-containing block copolymer (A) per 100 parts by weight of the nonvolatile content of the composition.

7. The optical information medium according to claim 1, wherein the hard coat agent composition further comprises inorganic fine particles (C) with an average particle size of not more than 100 nm.

8. The optical information medium according to claim 7, wherein the inorganic fine particles (C) are either fine particles of a metal (or semi-metal) oxide, or fine particles of a metal (or semi-metal) sulfide.

9. The optical information medium according to claim 8, wherein the inorganic fine particles (C) are fine particles of silica.

10. The optical information medium according to claim 8, wherein the inorganic fine particles (C) are modified on the surface with a hydrolyzable silane compound containing an active energy ray-reactive group.

11. The optical information medium according to claim 7, wherein the hard coat agent composition comprises 5 parts by weight or more and 500 parts by weight or less of the inorganic fine particles (C) per 100 parts by weight of the active energy ray-curable compound (B).

12. The optical information medium according to claim 11, wherein either one of the supporting substrate-side surface or the film element-side surface upon which the light is incident is formed of the hard coat layer.

13. The optical information medium according to claim 11, comprising an information recording layer on the supporting substrate, a light-transmitting layer on the information recording layer, and the hard coat layer on the light-transmitting layer.

* * * * *